(12) United States Patent
Yang

(10) Patent No.: US 8,577,921 B2
(45) Date of Patent: *Nov. 5, 2013

(54) METHOD AND APPARATUS FOR ENHANCED HASHING

(75) Inventor: Brian Hang Wai Yang, Monterey Park, CA (US)

(73) Assignee: Netlogic Microsystems, Inc., Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/567,608

(22) Filed: Sep. 25, 2009

(65) Prior Publication Data

US 2010/0017681 A1    Jan. 21, 2010

Related U.S. Application Data

(63) Continuation of application No. 10/703,842, filed on Nov. 7, 2003, now Pat. No. 7,617,241.

(51) Int. Cl.
*G06F 17/30* (2006.01)

(52) U.S. Cl.
USPC ............ 707/791; 707/802; 707/822; 707/828

(58) Field of Classification Search
USPC ................................................ 707/600–899
See application file for complete search history.

(56) References Cited

U.S. PATENT DOCUMENTS

| | | | |
|---|---|---|---|
| 5,491,700 A | 2/1996 | Wright et al. | |
| 6,467,060 B1 * | 10/2002 | Malakapalli et al. | 714/758 |
| 6,651,099 B1 * | 11/2003 | Dietz et al. | 709/224 |
| 6,738,935 B1 * | 5/2004 | Kimmitt | 714/701 |
| 6,904,057 B2 | 6/2005 | Sarkinen et al. | |
| 7,162,678 B2 * | 1/2007 | Saliba | 714/758 |
| 7,234,019 B1 | 6/2007 | Kao et al. | |
| 7,617,241 B2 | 11/2009 | Yang | 707/6 |
| 2003/0081615 A1 | 5/2003 | Kohn et al. | |
| 2003/0097520 A1 * | 5/2003 | Lai et al. | 711/103 |

OTHER PUBLICATIONS

Cormen et al., "Introduction to Algorithms" The MIT Press, Cambridge, Massachusetts London, England, 2001.
Non-Final Office Action dated Jul. 21, 2009 for U.S. Appl. No. 11/801,937.

* cited by examiner

*Primary Examiner* — Isaac M Woo
(74) *Attorney, Agent, or Firm* — Sterne, Kessler, Goldstein & Fox PLLC

(57) ABSTRACT

A search key lookup system including a hash table having a plurality of entries and a function generator is disclosed. The function generator can be coupled to the hash table and configured to receive a key and to provide a first function and a second function. The first function can be a Cyclic Redundancy Code (CRC) type function and the second function can be an Error Checking and Correcting (ECC) type function. Further, an address of the table can include a concatenation of the results of the CRC and the ECC type functions.

16 Claims, 4 Drawing Sheets

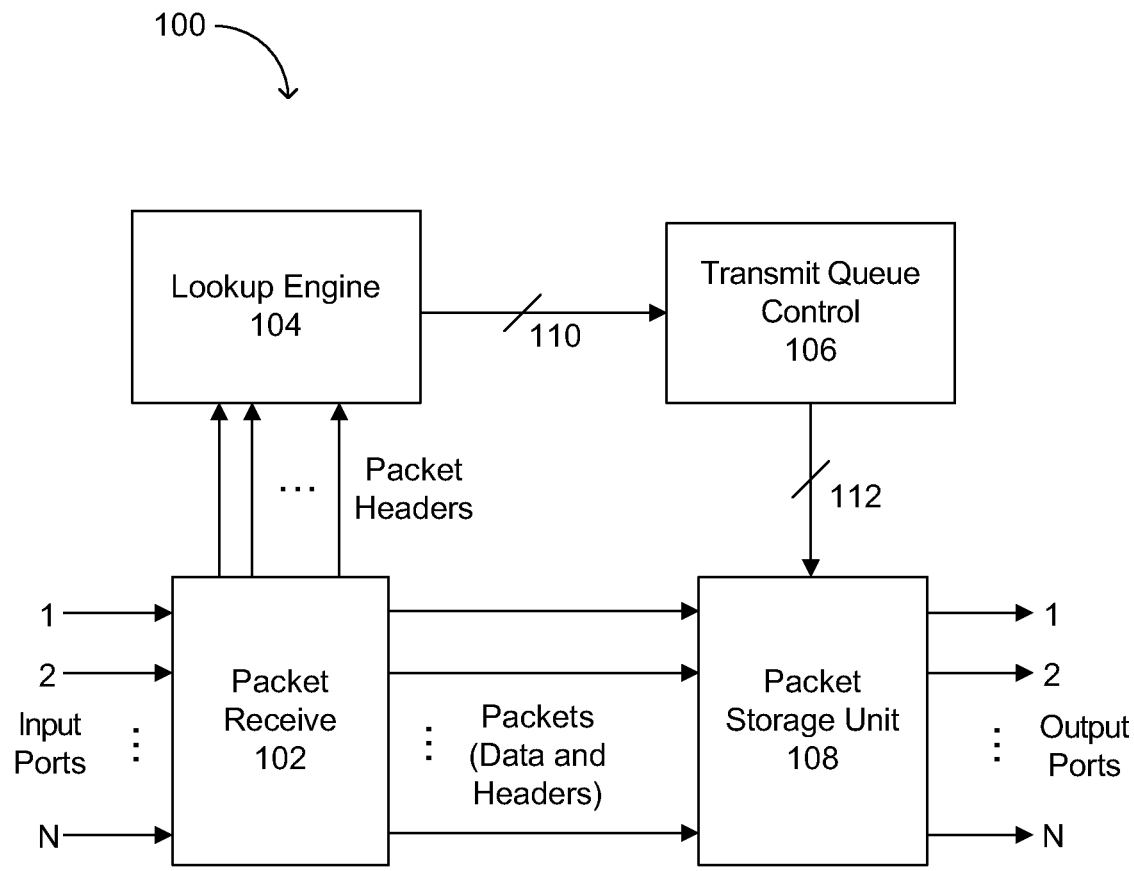
FIG. 1 (conventional)

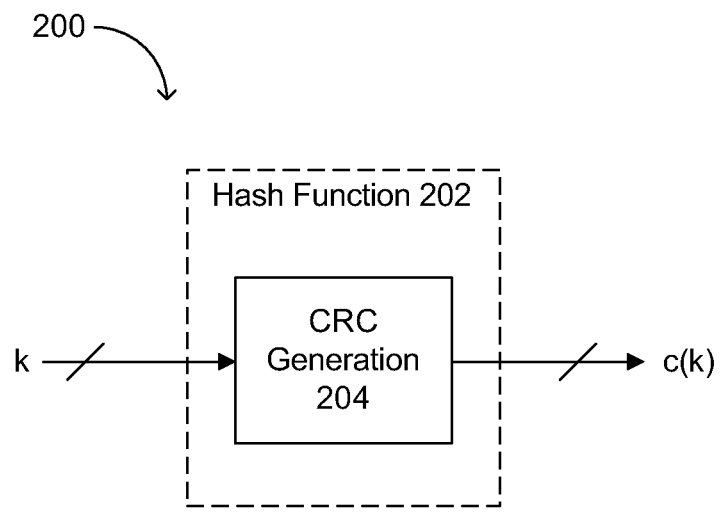
FIG. 2A (conventional)
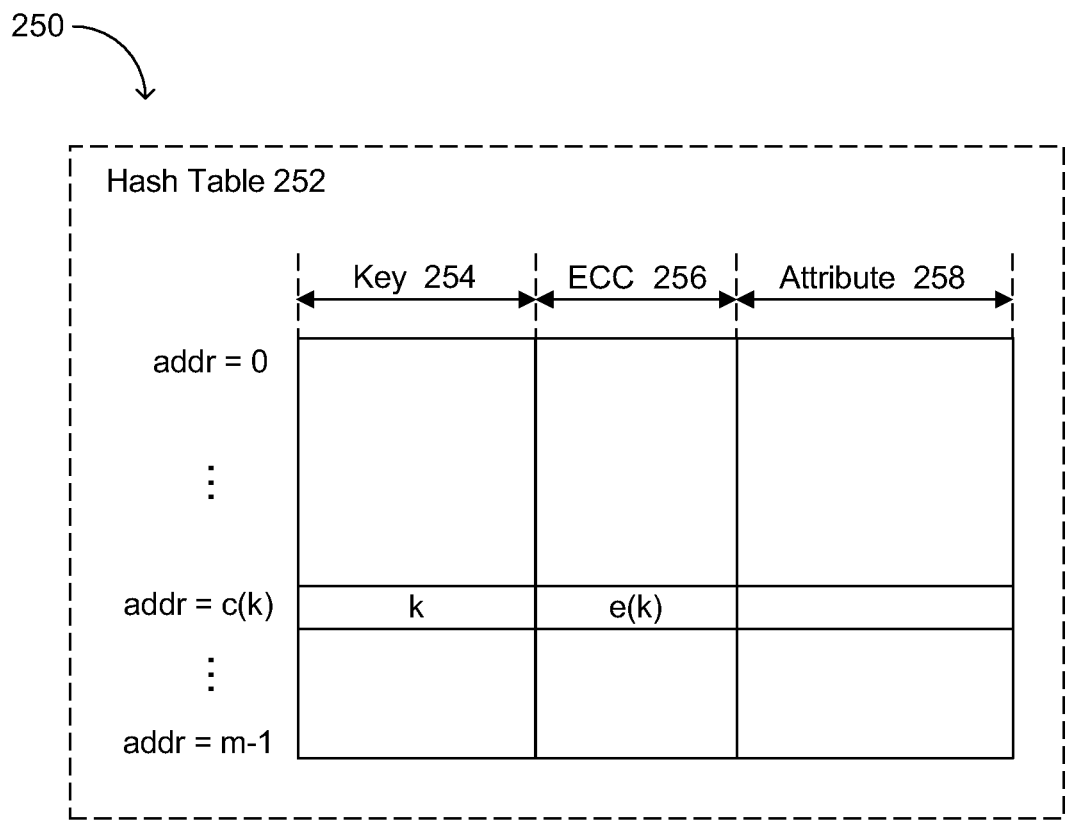
FIG. 2B (conventional)

METHOD AND APPARATUS FOR ENHANCED HASHING

REFERENCE TO RELATED APPLICATION(S)

The present application is a continuation of an application filed Nov. 7, 2003 now U.S. Pat. No. 7,617,241 under Ser. No. 10/703,842, which is incorporated herein by reference.

FIELD

The invention relates generally to the field of database searching and, more particularly, to a method and apparatus for enhanced hashing.

BACKGROUND

In networking systems, routers and/or switches typically move packets of information from one of a number of input ports to one or more output ports. Referring now to FIG. 1, a block diagram of a conventional router/switch system arrangement is shown and indicated by the general reference character 100. Input Ports 1, 2, . . . N can connect to Packet Receive 102, which can send Packet Headers to Lookup Engine 104 and Packets (Data and Headers) to Packet Storage Unit 108. The packet storage unit can store the packet data and the locations of this packet data can be identified by packet "pointers." Typically, only one copy of the packet data may be stored in the packet storage unit regardless of the packet type (e.g., unicast or multicast). Lookup Engine 104 can provide signals 110 to Transmit Queue Control 106. Signals 110 can include a packet type indication (e.g., unicast or multicast), a transmit port number, and/or a packet pointer, for example. Further, the packet type information can also include a Media Access Control Destination Address (MACDA), as only one example. Transmit Queue Control 106 can provide signals 112 to Packet Storage Unit 108, which can store data and control the selections to Output Ports 1, 2, . . . N. Signals 112 can include information such as a transmit enable, a packet pointer, and/or a transmit port number. In other words, Transmit Queue Control 106 can "schedule" or set an order of the packets to be transmitted for each output port in the system by indicating the packet pointer in signals 112.

A lookup function, such as may be implemented in Lookup Engine 104 or the like, can include a content addressable memory (CAM), but this approach may be relatively expensive. Another approach is to use a standard memory, such as static random-access memory (SRAM), with a direct indexing of the entries. However, because a typical key may be, for example, 60-bits wide, a $2^{60}$ universe (i.e., $2^{60}$ table entries) would be required and this approach may be impractical and/or cost-prohibitive. A more common approach is to use the standard memory as a hashing table, which essentially provides a "many-to-one" function so that the table size can be made substantially smaller and the overall system cost can be reduced.

Referring now to FIG. 2A and FIG. 2B, a conventional hashing approach will be described. In FIG. 2A, which is indicated by the general reference character 200, Hash Function 202 receives "k" and includes Cyclic Redundancy Code (CRC) Generation 204 to produce the function "c(k)." CRC is a commonly used hashing function. In FIG. 2B, which is indicated by the general reference character 250, Hash Table 252 can be indexed by c(k) as "addr=c(k)," for example. The hash table can include several fields, such as Key 254, Error Checking and Correcting (ECC) 256, and Attribute 258. As shown, "e(k)" can be the ECC code of "k" and this can be used to test if a stored key has been corrupted. The standard of corruption protection provided with this approach can include single-bit-error correction and double-bit-error detection (SECDED). The ECC field in the hash table can, in some applications, increase the memory width so that it is too large for readily available memory configurations. Thus, specialty memories, at increased cost, would likely be required. As an alternative, some applications may not use an ECC function, but this is not desirable because there would be no way of correcting the stored data if it has been unintentionally changed.

Consequently, what is needed is an enhanced hashing approach that does not include an ECC field in the hash table, but still maintains an ECC function.

SUMMARY

The invention overcomes the identified limitations and provides a hashing solution with efficient table entry storage and other advantageous features.

According to embodiments of the invention, a search key lookup system can include a hash table having a plurality of entries and a function generator. The function generator can be coupled to the table and configured to receive a key and to provide a first function and a second function. The first function can be a Cyclic Redundancy Code (CRC) type function and the second function can be an Error Checking and Correcting (ECC) type function. Further, an address of the table can include a concatenation of the results of the CRC and the ECC type functions.

According to another aspect of embodiments of the invention, a method of searching a hash table can include the steps of providing a first function of an incoming key, providing a second function of the incoming key, extracting a stored key from the table to provide an extracted key, performing a correction on the extracted key to provide a corrected key, and comparing the corrected key with the incoming key. The first function can be an ECC type function and the second function can be a CRC type function. Further, the correction can include an ECC type correction.

Advantages of the invention include providing efficient table entry storage while maintaining ECC functionality.

BRIEF DESCRIPTION OF THE FIGURES

Embodiments of the invention are described with reference to the FIGS, in which:

FIG. 1 is a block diagram of a conventional router/switch system arrangement.

FIG. 2A is a block diagram of a conventional hash function.

FIG. 2B is a diagram of a conventional hash table including ECC.

DETAILED DESCRIPTION

Embodiments of the invention are described with reference to specific diagrams depicting system arrangements and methods. Those skilled in the art will recognize that the description is for illustration and to provide the best mode of practicing the invention. The description is not meant to be limiting. For example, reference is made to specific function generators, such as Cyclic Redundancy Code (CRC) and Error Checking and Correcting (ECC) type functions, but the invention is applicable to other types of functions and/or mappings as well. Also, hash tables and the specific fields and/or arrangements thereof in a system merely provide example implementations and should not be construed as limiting. Further, the standard of corruption protection used in examples of this approach is single-bit-error correction and double-bit-error detection (SECDED), but the invention is applicable to other standards and/or types of corruption protection as well.

Figure 3A:
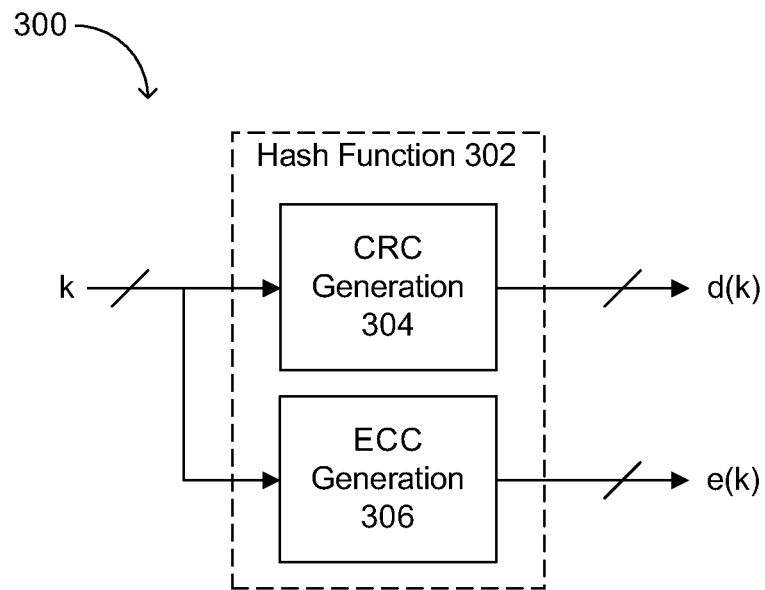
FIG. 3A is a block diagram of a hash function according to an embodiment of the invention.

Referring now to FIG. 3A, a block diagram of a hash function according to an embodiment of the invention is shown and indicated by the general reference character 300. An incoming key "k" can be received by Hash Function 302. Hash Function 302 can include function generators CRC Generation 304 and ECC Generation 306. An output of a CRC function of "k" can be denoted "d(k)" and an output of an ECC function of "k" can be denoted "e(k)." The d(k) code, according to embodiments, is shorter (i.e., fewer bits) than the output of corresponding conventional CRC functions. For example, a conventional CRC function may provide an output (e.g., c(k) of FIG. 2A) that is 14-bits wide, while the CRC function according to embodiments of the invention may provide, for example, an output (e.g., d(k)) that is only 7-bits wide. In this example, an ECC function output may also be only 7-bits wide. These function outputs can be used to index a hash table, as will be described below.

Figure 3B:
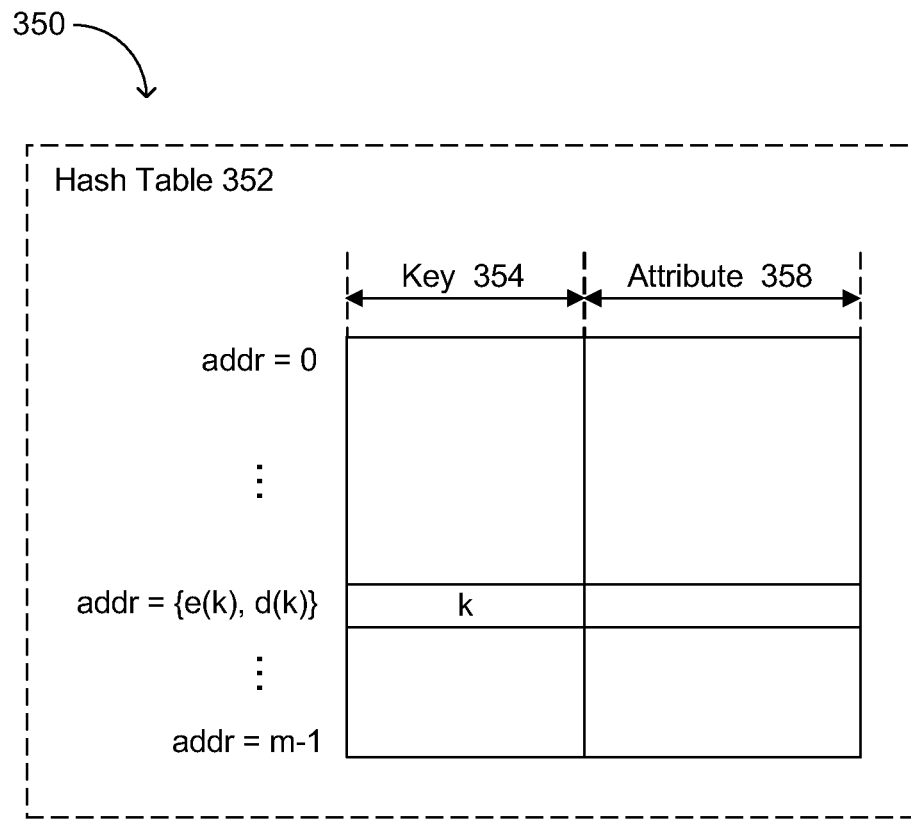
FIG. 3B is a diagram of a hash table according to an embodiment of the invention.

Referring now to FIG. 3B, a diagram of a hash table according to an embodiment of the invention is shown and indicated by the general reference character 350. Hash Table 352 can include a number of entries, such as "m" total entries for example. Accordingly, the addresses can range from "addr=0" to "addr=m−1" in the hash table. For a particular incoming key, such as "k," outputs of the hash function of FIG. 3A can be concatenated to form an address of the table. For example, "addr={e(k), d(k)}" can represent a concatenation of ECC and CRC function outputs. In this manner, the ECC function, for example, can be embedded in the address of the table instead of requiring a designated ECC field in the table. Of course, other information associated with the key may, in addition or instead of the ECC information, be embedded in the address. However, the table can be substantially without a field for storing such information associated with the key. Accordingly, in this particular example, the entries of the hash table can include fields Key 354 and Attribute 358, but no specific ECC field. This can allow for the use of a reduced-width and/or lower cost standard memory for the hash table. Such standard memories typically have set width configurations that may not be reasonably compatible with a hash table implementation that also provides ECC protection for the keys. However, embodiments of the invention can allow for the ECC protection standard of single-bit-error correction and double-bit-error detection (SECDED) to be maintained.

As an example application, a Media Access Control (MAC) address may be 48-bits wide, but the system application may only require storage of a subset of the possible keys. Thus, a set of "actually stored" keys may be substantially less than the $2^{48}$ "universe" of possible keys. An attribute, such as stored in the field Attribute 358, for each actually stored key can include a port number associated with the corresponding MAC address, for example. Further, this approach is applicable to common collision resolution methods, as used in typical hash table implementations.

Key insertion and search procedures can be described with reference to pseudo-code. Pseudo-code for inserting a key into the hash table can include:

```
i.   e = ecc_gen(k);
ii.  d = crc_gen(k);
iii. write_memory (.addr({e, d}), .data (k, attribute));
```

Pseudo-code for searching for a key in a hash table can include:

```
i.    e = ecc_gen(k);
ii.   d = crc_gen(k);
iii.  l = extract_key (read_memory(.addr({e, d})));
iv.   /* ecc code check and correction */
v.    g = ecc_correct (l, e); /* g is the corrected version of l */
vi.   /* done: ecc code check and correction */
vii.  /* check if found or not */
viii. if (g = = k)
         1. match = 1;
ix.   else
         1. match = 0;
x.    /* done: check if found or not */
```

Figure 4:
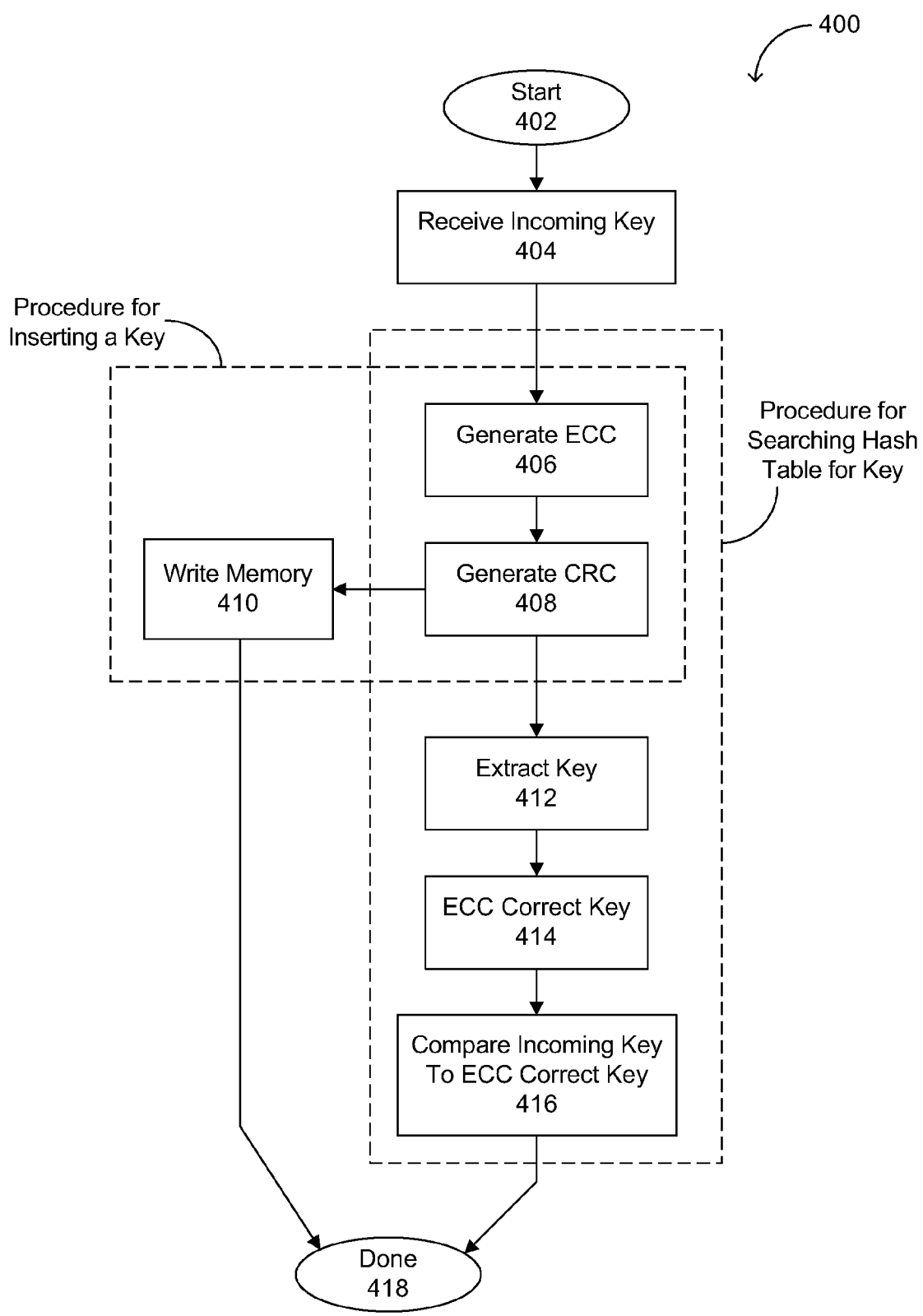
FIG. 4 is a flow diagram of key inserting and key searching methods according to embodiments of the invention.

Referring now to FIG. 4, a flow diagram of key inserting and key searching methods according to embodiments of the invention is shown and indicated by the general reference character 400. The flow can begin in Start 402 and proceed to Receive Incoming Key 404. The methods can generally include a Procedure for Inserting a Key and a Procedure for Searching Hash Table for Key, as indicated by the dashed boxes. In the insertion procedure, the flow can proceed to step Generate ECC 406, which can include providing an output from an ECC function generator of a hash function based on the incoming key. Next, the flow can proceed to step Generate CRC 408, which can include providing an output from a CRC function generator of the hash function based on the incoming key. Next, step Write Memory 410 can include writing the incoming key and attribute to the location indexed by an address formed by the concatenation of CRC and ECC function outputs, for example, before ending in Done 418.

The searching of the hash table for a key procedure can include the flow proceeding from step Generate CRC 408 to step Extract Key 412. The key extraction can include reading the memory at an address location referenced by the address formed by the concatenation of CRC and ECC function outputs, for example. Next, the flow can proceed to step ECC Correct Key 414. This ECC correction can provide an ECC corrected version of the extracted key. Next, the flow can proceed to step Compare Incoming Key To ECC Correct Key 416. This step can determine if a match or a mismatch occurred as a result of the search. Accordingly, if the incoming key was not found in the hash table, a mismatch indication can be provided. However, if the incoming key was found in the hash table, a match indication can be provided. The searching procedure can end in Done 418. Because many keys may be mapped into the same entry of the table, key information can be stored for each entry. Accordingly, this comparison with the stored key itself, or an ECC corrected version thereof, may be needed in order to determine if there is a true match in the hash table.

Advantages of the invention include providing efficient table entry storage while maintaining ECC functionality.

Having disclosed exemplary embodiments and the best mode, modifications and variations may be made to the disclosed embodiments while remaining within the subject and spirit of the invention as defined by the following claims.

The invention claimed is:

1. A search key lookup system, comprising:
a memory configured to store a table having a plurality of entries;
a function generator in communication with the table; and configured to provide a first function and a second function that use a key to generate outputs; and
a processor configured to concatenate the outputs of the first function and the second function to form an address of at least one of the plurality of entries of the table.

2. The search key lookup system of claim 1, wherein:
the address of an entry in the table includes information associated with the key.

3. The search key lookup system of claim 1, wherein:
the first function includes a Cyclic Redundancy Code (CRC) type function.

4. The search key lookup system of claim 1, wherein:
the second function includes an Error Checking and Correcting (ECC) type function.

5. The search key lookup system of claim 1, wherein:
the table includes a hash table.

6. The search key lookup system of claim 1, wherein:
a number of bits of the address is substantially less than a number of bits of the key.

7. The search key lookup system of claim 1, wherein the concatenation includes a concatenation of ECC and CRC function outputs.

8. The search key lookup system of claim 1, wherein an ECC function result forms part of the address of the table.

9. A method for operating a search key lookup system, comprising:
executing, with a function generator, a first function and a second function using a key to generate outputs; and
concatenating, with a processor, outputs of the first function and the second function to form an address of at least one of a plurality of entries of a table.

10. The method of claim 9, wherein:
the address of an entry in the table includes information associated with the key.

11. The method of claim 9, wherein:
the first function includes a Cyclic Redundancy Code (CRC) type function.

12. The method of claim 9, wherein:
the second function includes an Error Checking and Correcting (ECC) type function.

13. The method of claim 9, wherein:
the table includes a hash table.

14. The method of claim 9, wherein the method further comprises:
ensuring that a number of bits of the address is substantially less than a number of bits of the key.

15. The method of claim 9, wherein the concatenating includes concatenating ECC and CRC function outputs.

16. The method of claim 9, wherein an ECC function result forms part of the address of the table.

* * * * *